US012763567B2

(12) United States Patent
Burns et al.

(10) Patent No.: US 12,763,567 B2
(45) Date of Patent: Oct. 13, 2026

(54) ELECTROMAGNETIC COIL-BASED RAPID FAULT NEUTRALIZATION APPARATUS AND METHOD FOR ARC FAULT MANAGEMENT SYSTEMS

(71) Applicant: Eaton Intelligent Power Limited, Dublin (IE)

(72) Inventors: Robert Judson Burns, Hendersonville, NC (US); Daniel Edward Hrncir, Arden, NC (US); David Aaron Metcalf, Black Mountain, NC (US)

(73) Assignee: Eaton Intelligent Power Limited, Dublin (IE)

( * ) Notice: Subject to any disclaimer, the term of this patent is extended or adjusted under 35 U.S.C. 154(b) by 251 days.

(21) Appl. No.: 18/476,770

(22) Filed: Sep. 28, 2023

(65) Prior Publication Data

US 2025/0112449 A1 Apr. 3, 2025

(51) Int. Cl.

| | |
|---|---|
| ***H02H 1/00*** | (2006.01) |
| ***H01H 9/50*** | (2006.01) |
| ***H01H 83/20*** | (2006.01) |
| ***H02H 3/02*** | (2006.01) |

(52) U.S. Cl.

CPC ............ *H02H 1/0015* (2013.01); *H01H 9/50* (2013.01); *H02H 3/023* (2013.01); *H01H 2083/201* (2013.01)

(58) Field of Classification Search

CPC ........ H02H 1/0015; H02H 3/023; H01H 9/50; H01H 2083/201

See application file for complete search history.

(56) References Cited

U.S. PATENT DOCUMENTS

| | | | | |
|---|---|---|---|---|
| 6,891,120 | B2 * | 5/2005 | Ren | H01H 33/664 218/123 |
| 8,319,136 | B2 * | 11/2012 | Byron | H01H 79/00 218/126 |
| 8,861,144 | B2 | 10/2014 | Shea et al. | |
| 9,172,222 | B2 * | 10/2015 | Bozek | H02B 13/065 |
| 10,163,587 | B2 * | 12/2018 | Lee | H01H 9/30 |
| 10,424,442 | B2 * | 9/2019 | Ahn | H01H 9/30 |

(Continued)

FOREIGN PATENT DOCUMENTS

DE 202012001729 U1 * 4/2012 ............. H01H 79/00

OTHER PUBLICATIONS

DE202012001729U1 (Year: 2012).*

*Primary Examiner* — Crystal L Hammond
*Assistant Examiner* — Samantha L Faubert
(74) *Attorney, Agent, or Firm* — Stanek Lemon Crouse & Meeks, PA

(57) ABSTRACT

The present disclosure pertains to systems and methods for rapid fault neutralization. An apparatus for managing an electrical fault in an electrical system can include a bridging member configured to establish a conductive pathway between contact points that are at differing electrical phase potentials within the electrical system. The apparatus can include a propulsion system configured to cause movement of the bridging member towards the contact points in response to the electrical fault in the electrical system, thereby initiating the conductive pathway. In this way, the apparatus responds to the electrical fault by initiating a controlled electrical arc through the conductive pathway.

14 Claims, 6 Drawing Sheets

(56) References Cited

U.S. PATENT DOCUMENTS

| | | | | |
|---|---|---|---|---|
| 11,791,611 | B2 * | 10/2023 | Zhou | H02H 9/06 361/112 |
| 2016/0042896 | A1 * | 2/2016 | Kingston | H02B 13/025 218/157 |
| 2016/0285259 | A1 | 9/2016 | Shea et al. | |
| 2024/0258045 | A1 * | 8/2024 | Ahn | H01H 3/264 |

* cited by examiner

ELECTROMAGNETIC COIL-BASED RAPID FAULT NEUTRALIZATION APPARATUS AND METHOD FOR ARC FAULT MANAGEMENT SYSTEMS

FIELD

The present disclosure relates generally to the field of electrical fault management within electrical systems, and more particularly to arc quenching devices used to manage and mitigate the risks associated with arcing faults.

BACKGROUND

An arcing fault is a type of electrical fault in which an unintentional electrical path is created, allowing current to flow through an unexpected route. An arcing fault often occurs when electrical contacts within an electrical system are misaligned, damaged, or contaminated with foreign material, leading to a discharge of electricity through the air or other insulating material. The resulting electrical arc produces intense heat, which can cause fires, severe equipment damage, and significant hazards to personnel working with or near the electrical system.

Arc quenching devices have been developed to address the challenges of arcing faults. Quenching refers to the process of rapidly extinguishing or suppressing the electrical arc. Arc quenching devices aim to quickly detect and neutralize the arcing fault by creating a controlled, parallel arc or using other means to interrupt the unintended flow of electricity. However, limitations in speed, material constraints, sensitivity to environmental conditions, complexity of design, and other factors can hinder their effectiveness and provide a need for improvements.

SUMMARY

The present disclosure pertains to systems and methods for rapid fault neutralization. An apparatus for managing an electrical fault in an electrical system can include a bridging member configured to establish a conductive pathway between contact points that are at differing electrical phase potentials within the electrical system. The apparatus can include a propulsion system configured to cause movement of the bridging member towards the contact points in response to the electrical fault in the electrical system, thereby initiating the conductive pathway. In this way, the apparatus responds to the electrical fault by initiating a controlled electrical arc through the conductive pathway.

The apparatus of the previous paragraph can include one or more of the components or features of this paragraph. The apparatus can include an arc containment vessel configured to house the contact points. The bridging member can establish the conductive pathway within the containment vessel. The apparatus can include a sealing apparatus configured to engage with the arc containment vessel to prevent pressurized gas, developed as a result of the controlled electrical arc, from leaking out of the containment vessel. The arc containment vessel and the sealing apparatus can cooperate to contain and seal the ionized gases formed by melting, vaporizing, and ionizing of the bridging member during the initiation of the controlled electrical arc. The arc containment vessel can be configured to withstand a pressure of at least 3000 psi, the pressure resulting from the pressurized gas developed as a result of the controlled electrical arc, thereby ensuring containment and sealing of the ionized gases formed by the melting, vaporizing, and ionizing of the bridging member during the controlled electrical arc.

The apparatuses of any of the previous paragraphs can include one or more of the components or features of this paragraph. The bridging member can be configured to transition through states of melting, vaporizing, and ionizing to form the controlled electrical arc between the contact points, thereby effectuating dissipation of a current discharge associated with the electrical fault. The propulsion system can include a wire coil. The coil can generate a magnetic field responsive to being energized by the electrical fault. The magnetic field can cause the movement of the bridging member. The propulsion system can include an armature that can be magnetically polarized by the magnetic field. The magnetic field propels the armature in a direction towards the bridging member, causing movement of the bridging member to initiate the conductive pathway.

The apparatuses of any of the previous paragraphs can include one or more of the components or features of this paragraph. The apparatus can include an electrical insulator interposed between the bridging member and the armature, configured to electrically isolate the bridging member from the armature. The propulsion system can operate without the utilization of pyrotechnic elements. The apparatus can be configured as a single-use mechanism for managing arcing faults. The bridging member can include a conductive material selected from the group consisting of copper, aluminum, silver, and gold, and can be configured to create a short circuit between the contact points.

The apparatuses of any of the previous paragraphs can include one or more of the components or features of this paragraph. The apparatus can include an arc ignition device. The arc ignition device can include the bridging member, the propulsion system, and a threaded fastener configured to mechanically join the arc ignition device to one of the contact points. The initiation of the controlled electrical arc can occur in less than 3 milliseconds from the start of the electrical fault. The initiation of the controlled electrical arc can occur in less than 1.5 milliseconds from the start of the electrical fault.

The apparatuses of any of the previous paragraphs can include one or more of the components or features of this paragraph. The propulsion system can include a pyrotechnic gas generator configured to generate a controlled volume of gas upon detection of the electrical fault. The generated gas exerts a force, the force causing the movement of the bridging member towards the contact points, thereby initiating the conductive pathway. The electrical fault can correspond to a phase-to-phase short within the electrical system. The electrical fault managed by the apparatus can be an arcing fault. The arcing fault can be characterized by an unintended current discharge that occurs within the electrical system.

A method for managing an electrical fault in an electrical system can include detecting an electrical fault between contact points at differing electrical phase potentials within the electrical system; activating a propulsion system to cause movement of a bridging member towards the contact points, thereby initiating a conductive pathway between the contact points; initiating a controlled electrical arc through the conductive pathway by transitioning the bridging member through states of melting, vaporizing, and ionizing; containing and sealing ionized gases formed by the melting, vaporizing, and ionizing of the bridging member within an arc containment vessel with a sealing apparatus; effectuating dissipation of a current discharge associated with the electrical fault through the controlled electrical arc.

A propulsion system for managing an electrical fault in an electrical system can include a wire coil and an armature. The wire coil can generate a magnetic field responsive to being energized by the electrical fault. The armature is magnetically polarized by the magnetic field. The magnetic field propels the armature in a direction towards a bridging member, causing movement of the bridging member towards contact points at differing electrical phase potentials within the electrical system. The propulsion system can be configured to initiate a controlled electrical arc through a conductive pathway established by the bridging member, effectuating dissipation of a current discharge associated with the electrical fault.

BRIEF DESCRIPTION OF THE DRAWINGS

Throughout the drawings, reference numbers can be re-used to indicate correspondence between referenced elements. The drawings are provided to illustrate embodiments of the present disclosure and do not to limit the scope thereof.

DETAILED DESCRIPTION

Electrical systems operating in both industrial and consumer environments are susceptible to disruptions caused by electrical faults. Among these, arcing faults are of particular concern due to their ability to generate unintended high-energy electrical discharges that can lead to system degradation, fires, and in extreme cases, catastrophic failure. Existing solutions have limitations in the accuracy and speed with which they can address these specific types of electrical events.

The present patent application relates to inventive concepts for managing electrical faults, particularly arcing faults. The inventive concepts introduce an arc fault management assembly including a bridging member and a propulsion system. The bridging member serves to establish a conductive pathway between designated contact points within an electrical system, thus providing a route for fault current. The propulsion system can be configured to rapidly propel the bridging member into position between these contact points, thereby initiating a controlled electrical arc that can effectively neutralize the fault condition.

In some embodiments, the propulsion system utilizes an electrical coil that leverages electromagnetic coupling to accelerate an armature, which in turn propels the bridging member. This configuration can achieve a rapid response time, significantly faster than traditional methods, to initiate the controlled arc.

Advantages of these inventive concepts include rapid and safe response to electrical faults. The initiation of the controlled electrical arc can be configured to occur in a time frame shorter than what conventional fault management systems can achieve. Additionally, specialized arc containment vessels and sealing mechanisms can be included to contain and isolate ionized gases and other byproducts produced during the fault mitigation process. The design also accommodates various operational lifecycles, permitting both single-use and multiple-use configurations, and can feature modular components for extended operational longevity.

Arc Quenching Device

Figure 1:
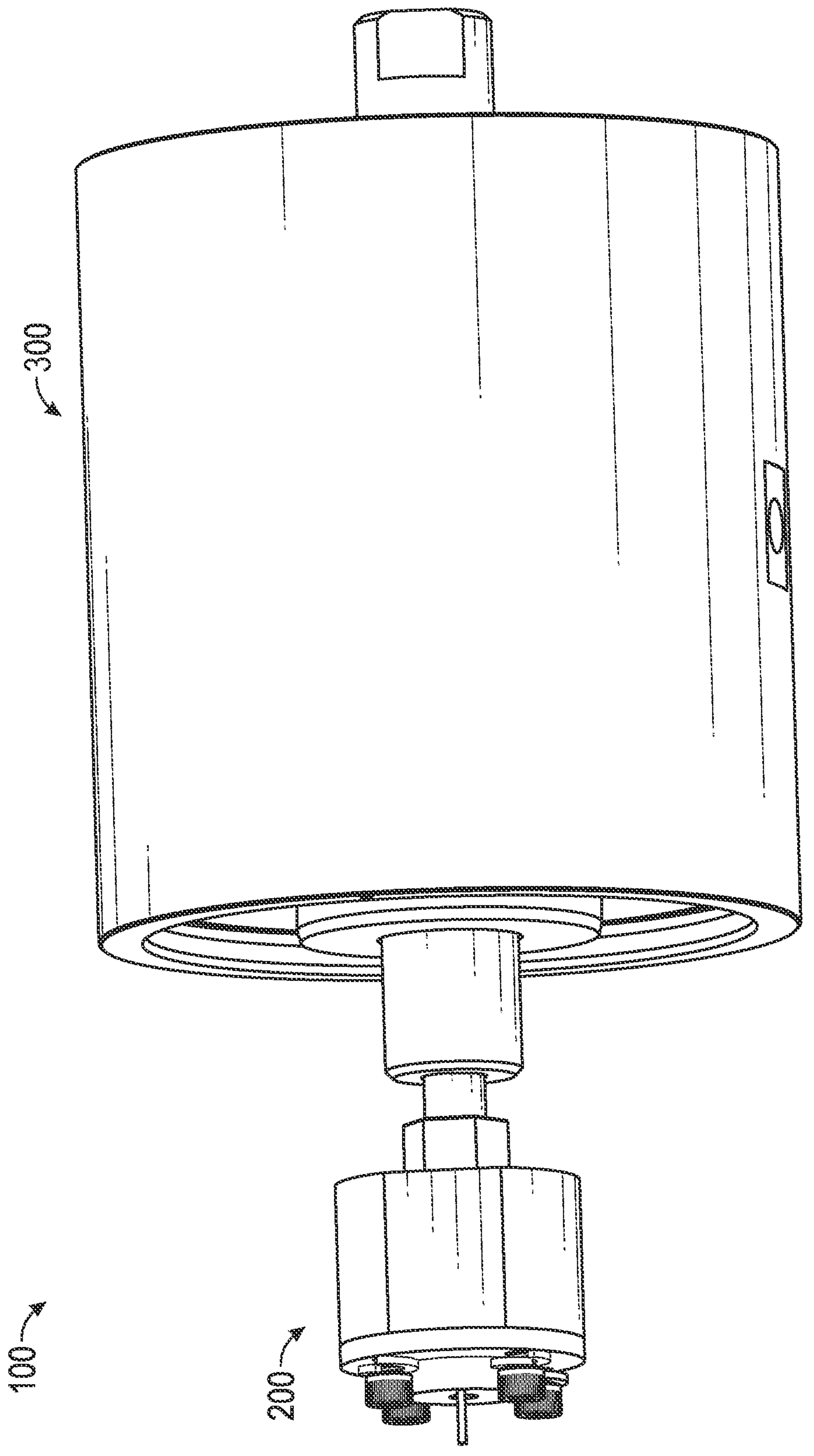
FIG. 1 illustrates a perspective view of an example arc fault management assembly for managing an electrical fault in an electrical system.

FIG. 1 illustrates a perspective view of an example arc fault management assembly 100 for managing an electrical fault in an electrical system. The arc fault management assembly 100 includes an arc ignition assembly 200 and an arc containment vessel 300. It will be appreciated that the arc fault management assembly 100 can include fewer, more, or different components or configurations.

The arc ignition assembly 200 can detect an electrical fault within an electrical system and initiate a controlled electrical arc. The arc ignition assembly 200 contributes to the management of electrical faults by mitigating the risks associated with unintended electrical discharges and by enhancing the overall safety and efficiency of the electrical system. The initiation of the controlled electrical arc can allow for the rapid and accurate response to electrical faults within the system. In some cases, the arc ignition assembly 200 can initiate the controlled electrical arc in less than 10 milliseconds, less than 5 milliseconds, less than 3 milliseconds, less than 2.5 milliseconds, less than 2 milliseconds, less than 1.5 milliseconds, or less than 1 millisecond (+/−0.25 ms).

In some cases, the arc ignition assembly 200 operates independently of pyrotechnic elements. For example, the arc ignition assembly 200 can include a propulsion system that includes an electrical coil that leverages electromagnetic coupling to propel an armature towards a bridging member with sufficient force for initiating the electrical arc. Such a configuration can offer a robust and reliable alternative to pyrotechnic-driven systems.

In some cases, the arc ignition assembly 200 can include a propulsion system that is driven by pyrotechnic elements, such as a micro gas generator (MGG). For example, the arc ignition assembly 200 can include an MGG that generates a controlled volume of gas upon detection of an electrical fault, exerting a force that propels an armature towards a bridging member. The force can be sufficient to initiate a controlled electrical arc, providing a rapid and effective response to electrical faults.

The arc containment vessel 300, generally cylindrical in shape, serves as a confinement chamber designed to manage the controlled electrical arc initiated by the arc ignition assembly 200. The vessel is engineered to contain and seal ionized gases and other byproducts formed during the initiation of the controlled electrical arc. Additionally, the design of the vessel prevents the ingress of external gases.

The arc containment vessel 300 can serve as a confinement chamber for the controlled electrical arc initiated by the arc ignition assembly 200. By containing and sealing ionized gases and other byproducts generated during the controlled electrical arc, the arc containment vessel 300 can mitigates risks such as unintended electrical discharges and can reduces the likelihood of electrical fires, equipment damage, or other hazardous conditions. In some cases, the arc containment vessel 300 can prevent the ingress of external fluids, thereby maintaining a controlled environment that further contributes to the safety and efficiency of the electrical system.

The arc containment vessel 300 may include materials and configurations that withstand high pressures and temperatures, thereby mitigating potential risks and enhancing the safety and efficiency of the electrical system. For example, the arc containment vessel 300 can be constructed from materials such as, but not limited to, non-magnetic stainless steel, high-strength steel, reinforced composites, or specialized alloys. The arc containment vessel 300 may be engineering to withstand the pressure resulting from the pressurized gas developed as a result of the controlled electrical arc, such as from the ionized gases formed by the melting, vaporizing, and ionizing of a bridging member during the controlled electrical arc. For example, in some cases, the arc containment vessel 300 is engineered to withstand a pressure of at least 1000 psi, at least 2000 psi, at least 2500 psi, at least 3000 psi, at least 3500 psi, at least 4000 psi (+/− about 250 psi).

The arc ignition assembly 200 and the arc containment vessel 300 can be mechanically integrated to form a cohesive unit for managing electrical faults. In particular, the arc ignition assembly 200 can be installed within or through the arc containment vessel 300, thereby ensuring a controlled environment for the initiation and containment of electrical arcs. As a non-limiting example, the arc ignition assembly 200, upon detecting an electrical fault, can initiate a controlled electrical arc, the byproducts of which, including ionized gases, are subsequently contained within the arc containment vessel 300. This mechanical interplay between the arc ignition assembly 200 and the arc containment vessel 300 can ensure that the controlled electrical arc is both initiated and contained in a manner that enhances the safety and efficiency of the electrical system. The arc containment vessel 300 can seal effectively, thereby preventing the egress of internal gases or the ingress of external gases, which contributes to the overall integrity and safety of the system.

The nature of the electrical fault addressed by the arc fault management assembly 100 can be diverse. In certain embodiments, the fault corresponds to a phase-to-phase short within an electrical system, such as switchgear. Functionally, the arc fault management assembly 100 is engineered to divert electrical current away from the affected circuit. This diversion facilitates a controlled release of energy over a specified duration, thereby mitigating the impact of the electrical fault on the system. In specific embodiments, energy is transferred by convection and the controlled release occurs over a duration approximately equal to a variable, X. This variable can vary across embodiments. For instance, X can be less than about 5, 10, 30, or 90 minutes, less than 1, 2, 4, 8, 14, 24, or 48 hours, less than 1, 2, 3, 5, or 7 days.

Example Arc Ignition Assembly

Figure 2A:
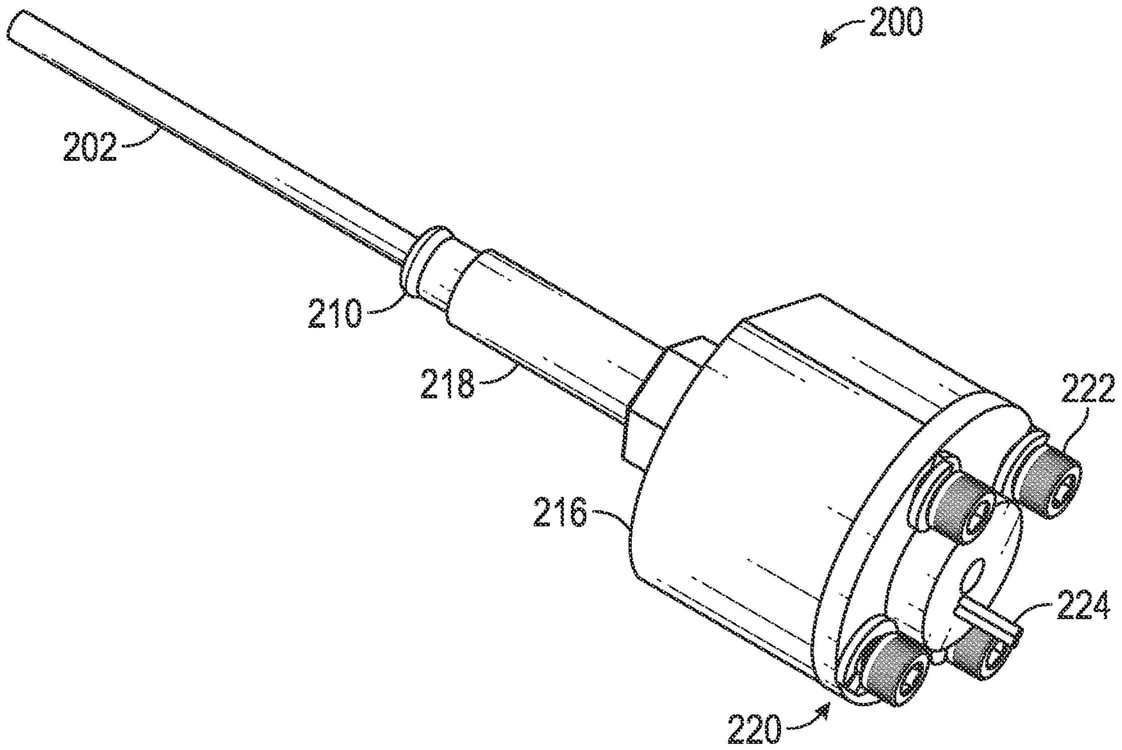
FIG. 2A illustrates the arc ignition assembly of FIG. 1, separate from the arc containment vessel.
Figure 2B:
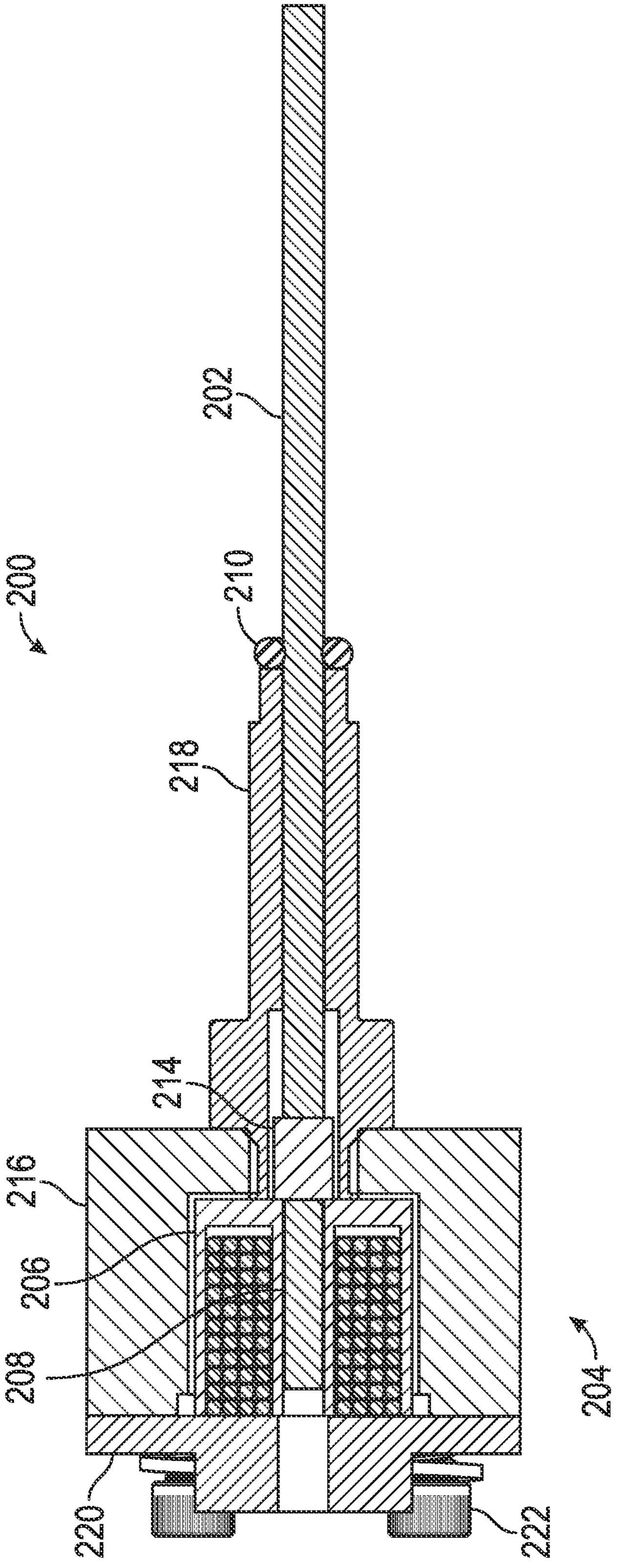
FIG. 2B illustrates a cross-sectional side view of the arc ignition assembly of FIG. 2A.

FIG. 2A illustrates the arc ignition assembly 200 of FIG. 1, separate from the arc containment vessel 300, and FIG. 2B illustrates a cross-sectional side view of the arc ignition assembly 200. Referring FIGS. 2A and/or 2B, the arc ignition assembly 200 includes a bridging member 202, a propulsion system 204, a containment seal 210, an isolation component 214, a housing 216, a threaded fastener 218, a housing end cap 220, retention elements 222, and/or wires 224. In this example, the propulsion system 204 includes an electromagnetic element 206 and a magnetic actuator 208. It will be appreciated that the arc ignition assembly 200 can include fewer, more, or different components or configurations.

The bridging member 202 is configured to establish a conductive pathway between contact points within the arc containment vessel 300 (e.g., contacts 302 and 304 of FIG. 3). For example, when an electrical fault occurs within a power circuit, the bridging member 202 is actuated to move from a first position, where the bridging member 202 does not establish an electrical pathway between contact points, to a second position, where it does. By creating a short circuit between the contact points, the bridging member 202 completes the power circuit, allowing electrical current to flow through the bridging member 202. This action initiates a controlled electrical arc, which serves to manage the electrical fault within the power circuit. As described herein, the movement of the bridging member 202 may be caused by the propulsion system 204. For example, the propulsion system 204 can cause movement of the bridging member 202 towards the contact points in response to an electrical fault in the power circuit, thereby initiating the conductive pathway between contact points.

Upon establishing a conductive pathway between contact points, the bridging member 202 completes the power circuit, thereby allowing the flow of electrical current through the bridging member 202. The electrical resistance of the bridging member 202 results in the release of thermal energy. This thermal energy can induce phase transitions in the bridging member 202, including melting, vaporization, and ionization, culminating in the formation of plasma. The presence of this plasma enables the flow of electrical current between the contacts, manifesting as a controlled electrical arc.

The dimensions, including size, shape, or thickness, of the bridging member 202 can vary to influence the duration of the controlled electrical arc. As an example, the bridging member 202 can be a generally elongate member. In certain embodiments, the bridging member 202 is configured with sufficient mass such that the controlled electrical arc persists for a duration of X, where X can vary depending on the embodiments. In some cases, a controlled electrical arc persists for the duration needed to generate an ionized cloud to break down the dielectric potential between the arcing contacts. For example, X can be hours depending on the environmental conditions.

The composition of the bridging member 202 can include conductive or highly conductive materials with varying degrees of electrical conductivity. Examples of such materials encompass, but are not limited to, copper, steel, aluminum, silver, and gold. In some cases, the bridging member 202 can be referred to as an ignition pin.

The temporal aspect of the bridging member's movement can be important in quickly quenching the electrical fault. In some implementations, the bridging member 202 is designed to transition between its initial and final positions within a time frame of 1.5 milliseconds. In some cases, the time is less than 10 milliseconds, less than 5 milliseconds, less than 3 milliseconds, less than 2.5 milliseconds, less than 2 milliseconds, less than 1.5 milliseconds, or less than 1 millisecond (+/−0.25 ms).

The propulsion system 204 can be configured to actuate the bridging member 202 upon detection of an electrical fault within the power circuit, thereby facilitating the establishment of the conductive pathway. In certain embodiments, the propulsion system 204 comprises elements that are responsive to electrical fault conditions within the power circuit and effectuate the requisite motion of the bridging member 202.

The implementation of the propulsion system 204 can vary across embodiments. For example, in the illustrated embodiment of FIG. 2A, the propulsion system 204 includes an electromagnetic element 206, such as a wire coil, that generates magnetic field responsive to being energized by the electrical fault. In this way, the arc ignition assembly 200 can operate independently of, or without, pyrotechnic elements. In this example, the magnetic field causes the movement of the bridging member 202. For example, the propulsion system 204 can include a magnetic actuator 208, such an armature, that is magnetically polarized by the magnetic field. The magnetic field propels the magnetic actuator 208 in a first direction, effectuating the motion of the bridging member 202 in the same first direction to establish the conductive pathway. It should be appreciated that, in certain embodiments, the propulsion system 204 can employ mechanical elements to direct the bridging member 202 in a direction divergent from the first direction of the magnetic actuator 208, for example, in a second direction opposite to the first. Such a configuration can be advantageous in accommodating alternative arrangements or addressing spatial constraints within the system.

In some cases, the propulsion system 204 includes one or more pyrotechnic elements (not shown). For example, the arc ignition assembly 200 can include an MGG. In some such cases, the arc ignition assembly 200 can include an MGG that generates a controlled volume of gas upon detection of the electrical fault, exerting a force that causes the movement of the bridging member 202. For example, the controlled volume of gas can exert a force that propels an armature towards the bridging member 202, moving the bridging member 202 such that it establishes the conductive pathway between the contacts.

The arc ignition assembly 200 may include one or more containment seals 210 for mitigating the escape of pressurized gas generated due to the arcing fault within the arc containment vessel 300. In some embodiments, the containment seal 210 can be realized as a sealing ring that either fully or partially encircles a segment of the bridging member 202. This arrangement can establish a hermetic or substantially hermetic interface between the bridging member 202 and a portion of the arc containment vessel 300.

The isolation component 214 can be positioned between the bridging member 202 and the magnetic actuator 208, functioning to electrically isolate the two components from each other. In some embodiments, the isolation component 214 can be implemented as an electrical insulator composed of materials such as ceramic, polymer, or composite materials. In this way, the isolation component 214 can increase the likelihood that no electrical continuity exists between the bridging member 202 and the magnetic actuator 208.

The housing 216 houses some or all of the components of the propulsion system 204. For example, in the illustrated embodiment, the housing 216 houses the electromagnetic element 206 and the magnetic actuator 208, aligning these components with an internal cavity in a threaded fastener 218 that is configured to mechanically join the arc ignition assembly 200 to one of the contact points of the arc containment vessel 300. It should be appreciated that alternative couplings, such as clamps, rivets, or snap-fit connections, can be employed in place or, or supplemental to, the threaded fastener 218. In some cases, the housing includes a housing end cap 220 removably attached to an end of the housing 216. The housing 216, including the housing end cap 220, can secure the internal components of the arc ignition assembly 200. The arc ignition assembly 200 can include retention elements 222 to ensure the housing 216 and/or housing end cap 220 remains securely positioned, thereby maintaining the internal components of the arc ignition assembly 200. A hole is provided in the housing end cap 220 to allow wires 224 from the electromagnetic element 206 to exit the arc ignition assembly 200 for external connection to a circuit designed to deliver electrical activation energy to the electromagnetic element 206.

Example Containment Vessel

Figure 3A:
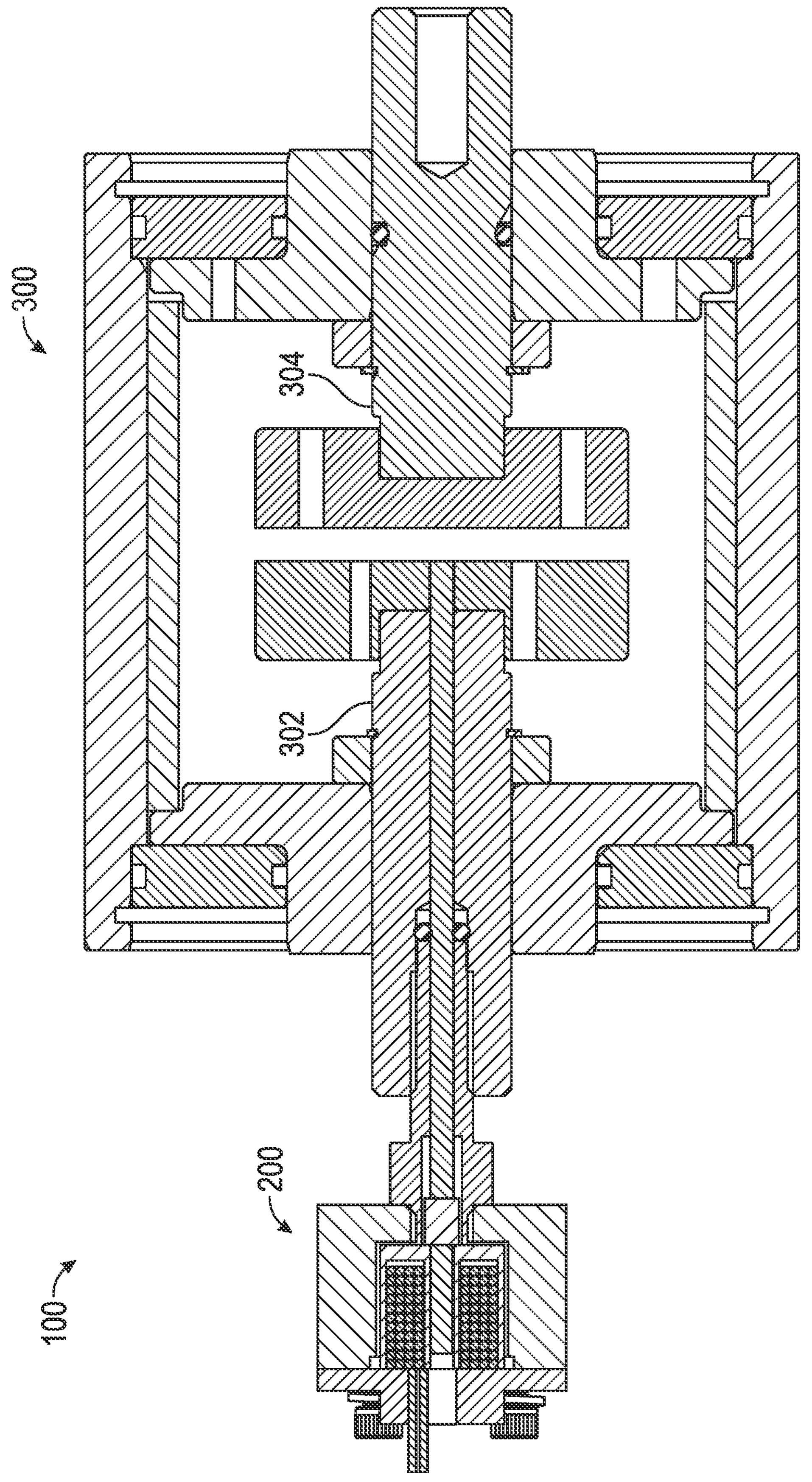
FIG. 3A illustrates a cross-sectional side view of the arc fault management assembly of FIG. 1.
Figure 3B:
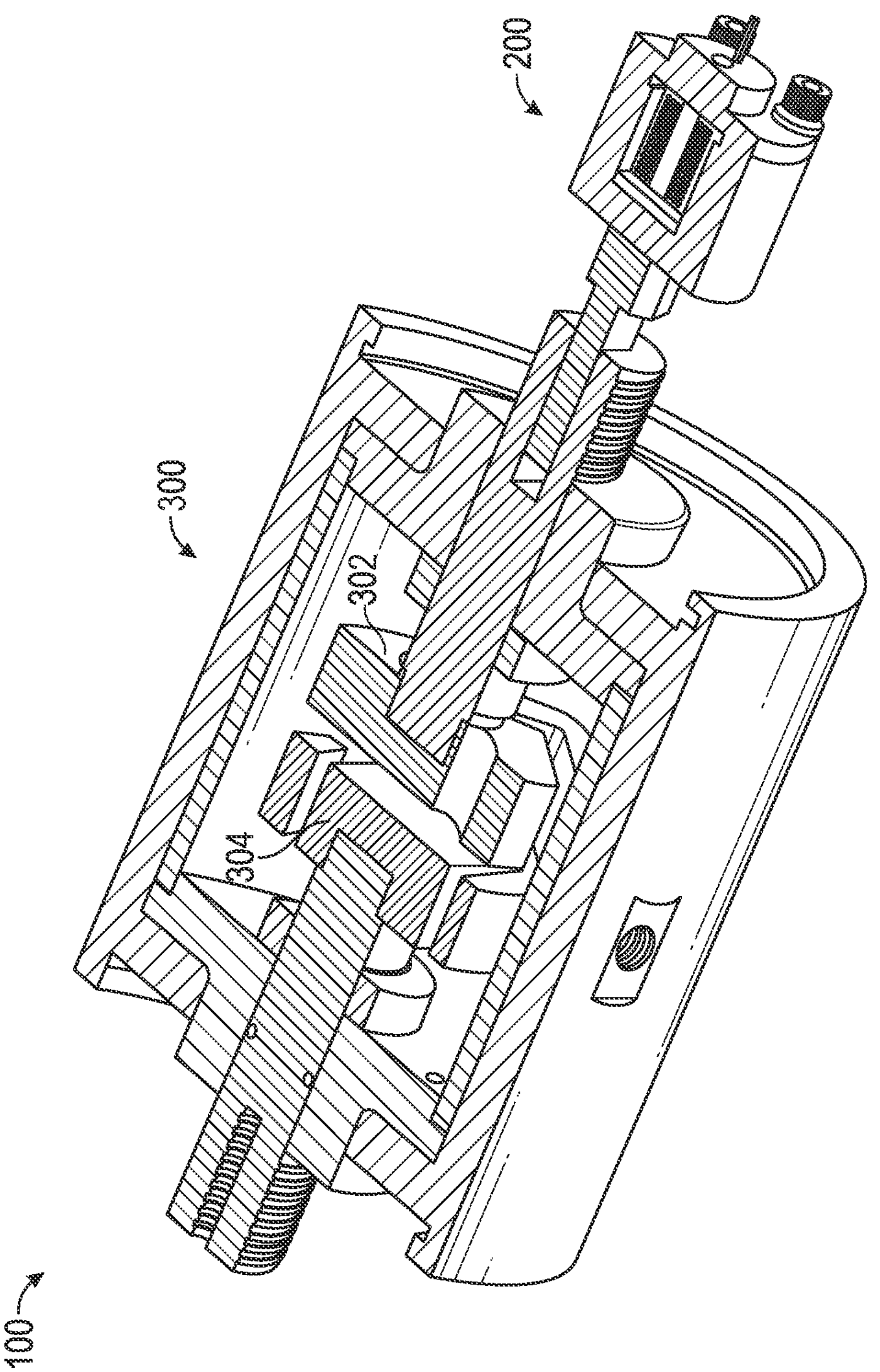
FIG. 3B illustrates a sectional perspective view of the arc fault management assembly of FIG. 1.

FIGS. 3A and 3B illustrate a cross-sectional side view and a sectional perspective view, respectively, of the arc fault management assembly 100 of FIG. 1. The arc fault management assembly 100 includes the arc ignition assembly 200 and the arc containment vessel 300. The arc containment vessel 300 houses/supports a first contact point 302 and a second contact point 304, each at differing electrical phase potentials within an electrical system.

The contact points within the electrical system can be at differing electrical phase potentials and, in some cases, can be at opposite potentials. The arc containment vessel 300 can serve as a specialized enclosure designed to withstand elevated pressures, such as those resulting from ionized gases formed during the initiation of a controlled electrical arc. The bridging member 202 can extend at least partially into the arc containment vessel 300, such that the conductive pathway between the first and second contact points is within the arc containment vessel 300.

The sealing mechanism employed in the arc fault management assembly 100 diverges from conventional techniques that allow gases to exit. In some instances, this unique sealing approach can increase safety. A failure in the sealing apparatus could result in a catastrophic event, such as an explosion, due to the high pressures and ionized gases contained within the vessel.

As described, the bridging member 202 is engineered to form a conductive pathway between the first contact point 302 and the second contact point within the arc fault management assembly 100. The arc fault management assembly 100 can be designed for various operational lifecycles. In certain embodiments, the arc fault management assembly 100 is single-use; upon successful mitigation of an electrical fault, the arc fault management assembly 100 is to be replaced in its entirety. In alternative embodiments, the arc fault management assembly 100 is configured for multiple fault mitigations. This can be achieved through design features of the bridging member 202 that prevent its complete vaporization upon activation, thereby allowing for multiple uses before requiring replacement. Furthermore, modular components of the arc fault management assembly 100, such as the bridging member 202, may be individually replaceable, extending the operational lifecycle of the assembly.

Example Arc Ignition Assembly

Figure 4:
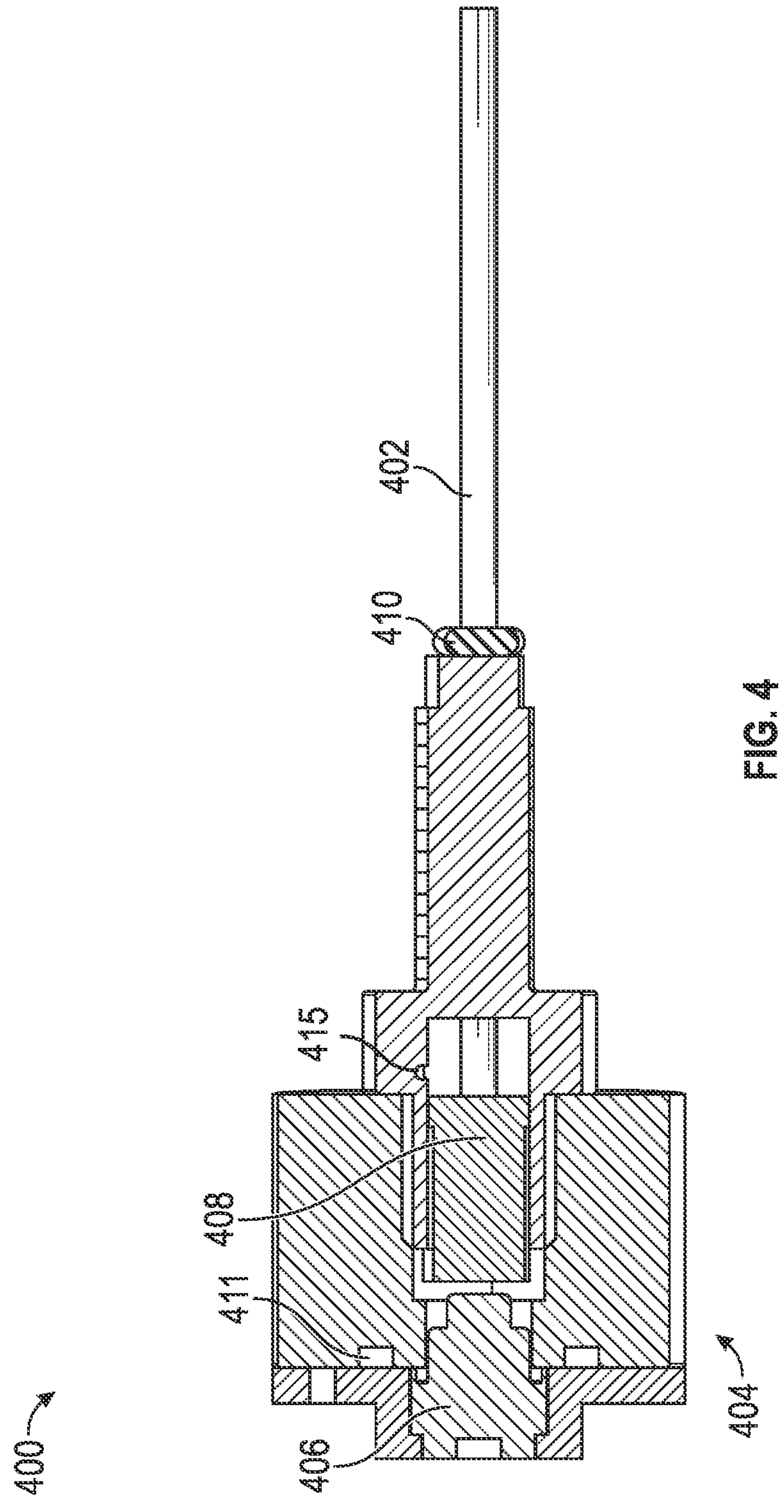
FIG. 4 illustrates an example arc ignition assembly, which can be integrated into the arc fault management assembly as a substitute or complement to the arc ignition assembly.

FIG. 4 illustrates an example arc ignition assembly 400, which can be integrated into the arc fault management assembly 100 as a substitute or complement to the arc ignition assembly 200. The arc ignition assembly 400 may embody, or incorporate, various components or features inherent to the arc ignition assembly 200. The arc ignition assembly 400 includes a bridging member 402, a propulsion system 404, and containment seals 410, 411. In this example, the propulsion system 404 includes an example micro gas generator (MGG) 406, a drive piston 408, and a weep hole 415. It will be appreciated that the arc ignition assembly 400 can include fewer, more, or different components or configurations.

In the example shown in FIG. 4, the propulsion system 404 operates through pyrotechnic elements, specifically utilizing an MGG 406. Upon detection of an electrical fault, the MGG 406 generates a controlled volume of gas. This gas exerts a force on the drive piston 408, propelling it in the direction of the bridging member 402. The applied force is sufficient to move the bridging member 402 to establish a conductive pathway between the contacts housed within the arc containment vessel 300. This conductive pathway initiates a controlled electrical arc, thereby offering a swift and efficient mechanism for managing electrical faults.

The weep hole 415 can allow venting of excess gas pressure after the bridging member 402 has completed its travel. This design feature can help maintain the operational integrity of the system. The containment seal 411 can be configured to securely confine the gas produced by the MGG 406.

Terminology

Although this disclosure has been described in the context of certain cases and examples, it will be understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may include, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some cases, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain cases include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain cases require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain cases, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An apparatus for managing an electrical fault in an electrical system, comprising:

a bridging member configured to establish a conductive pathway between contact points, wherein the contact points are at differing electrical phase potentials within the electrical system; and a propulsion system configured to cause movement of the bridging member towards the contact points in response to the electrical fault in the electrical system, thereby initiating the conductive pathway;

wherein the apparatus responds to the electrical fault by initiating a controlled electrical arc through the conductive pathway, wherein the bridging member is dimensioned and composed such that, upon establishment of the conductive pathway, electrical current passing through the bridging member causes the bridging member to transition through at least melting and vaporizing states, thereby generating ionized material between the contact points, and wherein the controlled electrical arc is sustained by the ionized material generated from the bridging member.

2. The apparatus of claim 1, further comprising:

an arc containment vessel configured to house the contact points, wherein the bridging member establishes the conductive pathway within the containment vessel; and a sealing apparatus configured to engage with the arc containment vessel to prevent pressurized gas, developed as a result of the controlled electrical arc, from leaking out of the containment vessel, wherein the arc containment vessel and the sealing apparatus cooperate to contain and seal the ionized gases formed by melting, vaporizing, and ionizing of the bridging member during the initiation of the controlled electrical arc.

3. The apparatus of claim 2, wherein the arc containment vessel is configured to withstand a pressure of at least 0 psi, the pressure resulting from the pressurized gas developed as a result of the controlled electrical arc, thereby ensuring containment and sealing of the ionized gases formed by the melting, vaporizing, and ionizing of the bridging member during the controlled electrical arc.

4. The apparatus of claim 1, wherein the bridging member is configured to transition through states of melting, vaporizing, and ionizing to form the controlled electrical arc between the contact points, thereby effectuating dissipation of a current discharge associated with the electrical fault.

5. The apparatus of claim 1, wherein the propulsion system of the apparatus operates without the utilization of pyrotechnic elements.

6. The apparatus of claim 1, wherein the apparatus is configured as a single-use mechanism for managing arcing faults.

7. The apparatus of claim 1, wherein the bridging member includes a conductive material selected from the group consisting of copper, aluminum, silver, and gold, and is configured to create a short circuit between the contact points.

8. The apparatus of claim 1, further comprising an arc ignition device, said device comprising the bridging member, the propulsion system; and a threaded fastener configured to mechanically join the arc ignition device to one of the contact points.

9. The apparatus of claim 8, further comprising an end cap and fastener, wherein the end cap is configured to be installed on an end of the arc ignition device, and wherein the fastener secures the end cap in place, thereby retaining internal components of the arc ignition device.

10. The apparatus of claim 1, wherein the initiation of the controlled electrical arc occurs in less than 3 milliseconds from the start of the electrical fault.

11. The apparatus of claim 1, wherein the initiation of the controlled electrical arc occurs in less than 1.5 milliseconds from a start of the electrical fault.

12. The apparatus of claim 1, wherein the electrical fault corresponds to a phase-to-phase short within the electrical system.

13. The apparatus of claim 1, wherein the electrical fault managed by the apparatus is an arcing fault, the arcing fault characterized by an unintended current discharge that occurs within the electrical system.

14. A method for managing an electrical fault in an electrical system, the method comprising:

detecting an electrical fault between contact points at differing electrical phase potentials within the electrical system;

activating a propulsion system to cause movement of a bridging member towards the contact points, thereby initiating a conductive pathway between the contact points;

initiating a controlled electrical arc through the conductive pathway after establishment of the conductive pathway, wherein fault current passing through the bridging member causes the bridging member to undergo a material phase transition including melting and vaporization, thereby generating ionized material from the bridging member between the contact points, and wherein the controlled electrical arc is sustained by the ionized material generated from the bridging member;

containing and sealing ionized gases formed by the melting, vaporizing, and ionizing of the bridging member within an arc containment vessel; and effectuating dissipation of a current discharge associated with the electrical fault through the controlled electrical arc.

* * * * *